United States Patent [19]

Schaetti

[11] 3,737,989

[45] June 12, 1973

[54] METHOD OF MANUFACTURING COMPOSITE SUPERCONDUCTOR

[75] Inventor: Norbert Schaetti, Glattbrugg, Switzerland

[73] Assignee: Maschinenfabrik Oerlikon, Zurich, Switzerland

[22] Filed: Nov. 19, 1971

[21] Appl. No.: 200,554

Related U.S. Application Data

[62] Division of Ser. No. 43,992, June 8, 1970, Pat. No. 3,643,001.

[52] U.S. Cl.............................. 29/599, 174/DIG. 6
[51] Int. Cl............................................. H01v 11/00
[58] Field of Search........................ 29/599, 157 C; 174/15 C, 126 CP, 128, DIG. 6; 335/216

[56] References Cited
UNITED STATES PATENTS

| | | | |
|---|---|---|---|
| 3,643,002 | 2/1972 | Minnich | 174/15 C |
| 3,453,378 | 7/1969 | McInturff | 335/216 X |
| 3,626,585 | 12/1971 | Hammer et al. | 29/599 |
| 3,657,466 | 4/1972 | Woolcock et al. | 174/DIG. 6 |
| 3,699,647 | 10/1972 | Bidault et al. | 29/599 |
| 2,687,278 | 8/1954 | Smith et al. | 29/157 C |
| 3,692,637 | 9/1972 | Dederra et al. | 29/157 C |

FOREIGN PATENTS OR APPLICATIONS

| | | | |
|---|---|---|---|
| 1,130,464 | 10/1968 | Great Britain | 174/DIG. 6 |
| 1,463,138 | 12/1966 | France | 174/DIG. 6 |

Primary Examiner—Charles W. Lanham
Assistant Examiner—D. C. Reiley, III
Attorney—Flynn & Frishauf

[57] ABSTRACT

Sections of hollow longitudinal support tubes are joined to form a continuous fluid-tight tube to which superconductor assembly wires are first applied, then, if desired, non-superconductive wires are wrapped therearound with a direction of twist opposite to that of the superconductor wires, the wires being placed closely adjacent each other so that, upon immersion into a melt of good heat-conductive, non-magnetizable material, the fluid material will flow by capillary action in the interstices between the wires to form a composite, encapsulated whole.

7 Claims, 1 Drawing Figure

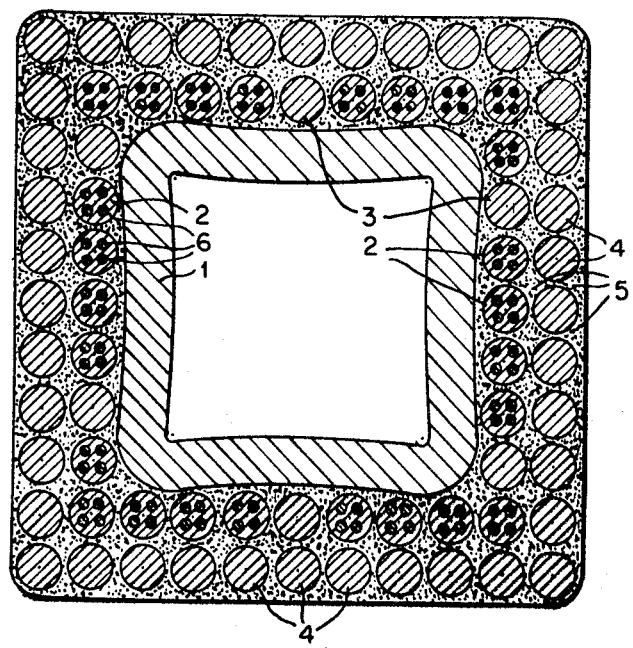

METHOD OF MANUFACTURING COMPOSITE SUPERCONDUCTOR

The present invention relates to a method to manufacture composite superconductors and is a division of application Ser. No. 43,992, filed June 8, 1970 (Swiss priority July 8, 1969), now U.S. Pat. No. 3,643,001.

It has previously been proposed to form superconductors of hollow tubes and circulate the cooling medium in the interior of the tubes under pressure. Stabilized superconductors have been proposed in which an assembly is provided consisting of a normally conductive material, such as copper, in which single filaments of superconductive material are embedded. The copper, if used, may be plated on the single filaments or the filaments may be embedded in the copper by means of a cold working process. These known, stabilized superconductor tubes, and particularly if they have a fairly substantial cross-section, have the disadvantage that, when ordinary drawing processes are to be used, their length is limited to a maximum of about 50 meters. Since, however, frequently superconductors of substantially greater length are necessary, numerous joints and junctions are required which cause mechanical as well as electrical problems.

A superconductor may be made in which a normally conductive support material, which is hollow, has stabilized superconductors applied at the outer surface thereof, the stabilized superconductors being in ribbon form. Such a composite superconductor assembly has the advantage that the number of joints between the superconductive bands or tapes can be substantially reduced, so that the composite superconductor assembly will have high mechanical strength and that coils of a relatively small radius may be manufactured therefrom. Additionally, the manufacturing costs are comparatively low and the manufacturing processes are relatively simple. During the manufacture, a support is first provided by joining together predetermined lengths of support tubes and then the tapes of superconductive material are applied to the outer surface of the support tube by means of a bonding layer.

Single filamentary superconductors which are parallel to the axis of the support tube cause eddy currents which can become substantial. These eddy currents give rise to an undesired magnetic field which is additional to any magnetic field desired to be applied to the superconductor. The strength of this additional magnetic field is not controllable. The value of the eddy currents themselves depends on the rate of change of the magnetic field, that is of the speed with which flux cuts the windings; the eddy currents may have a decay time which may be in the order of 1,000 hours — that is, a long time. The magnetic fields, due to the eddy currents, may have a field strength of several percent of the desired magnetic field; and after the magnetic field has been discontinued, remanent fields in the order of several thousand Gauss may remain over a substantial period of time.

For the foregoing reasons it is not possible to use superconductive magnets of the above type in precision measurements, a disadvantage which arises particularly when such superconductors are to be used in large bubble chambers.

It is an object of the present invention to provide a method to make composite superconductor, in which the above disadvantages are avoided.

SUBJECT MATTER OF THE PRESENT INVENTION

Rather than arranging superconductor assemblies parallel to the axis of the support, the superconductor assemblies are helically, that is spirally applied to the support through which the cooling medium flows. A good heat-conductive, non-magnetizable bonding material interconnects these spirally applied superconductors to the outer surface of the support.

The helical twist of the individual superconductor assemblies greatly decreases, and may completely avoid the difficulties previously experienced with hollow composite superconductors.

According to a preferred form, the bonding material comprises a tin alloy, or pure indium; the melting temperature should not be over 320° C. In a preferred form, the composite superconductor is formed of a plurality of layers; first, a layer directly applied to the support tube formed entirely, or largely of superconductor assemblies and, thereabove, a second layer of wires having a direction of twist opposite to that of the first layer, and formed of wires of normally conductive material, such as copper.

The wires of the first layer, and also of the second, if used, are preferably placed close to each other so that only small spaces will be left therebetween so that when the composite support and the layer, or layers of wire are dipped into a melt of bonding material, the bonding material will flow between the wires to totally surround the wires and support, and encapsulate the wires and support. This flow will be by capillary action. If it is desired to form the superconductor with a square cross-section, then a circular support may be first provided on which the superconductor assemblies are applied and the entire, composite unit is then deformed in such a manner that the desired and square, or rectangular cross-section is obtained.

The invention will be described by way of example with reference to the accompanying drawing, wherein the single FIGURE illustrates a cross-sectional view of a composite superconductor in accordance with the present invention.

An elongated, hollow support 1, for example of copper, or of other normally electrically conductive material has stabilized superconductor assemblies 2 applied to the outside surface thereof. A cooling medium may be circulated through the hollow interior of the support 1. The superconductor assemblies 2 consist of single filaments 6, at least two, and preferably four (as shown) per assembly, surrounded by copper so that they are, inherently, stabilized. The materials of filament 6 may be alloys of titanium-niobium or niobium-zirconium. The layers of superconductor assemblies 2 are applied in helically progressing, spiral form with a pitch of, for example, 30 cm per spiral turn. Wires 3 of non-superconductive material, for example copper, may be interposed in the layer of superconductor assemblies, and spiralled therewith.

The first layer is covered by a second layer of wires 4, likewise helically spiralled but wound in a spiralling direction which is opposite to the direction of twist of the first layer, that is of wires 2, 3. The pitch of the wires of layer 4, which are of non-superconductive material such as copper is, for example, 15 cm per twist. The support 1, the first layer of wires 2, 3, and the second layer of wire 4 are securely bonded together by a bonding material 5, for example a tin-silver solder. The second layer of wires 4 is a protection against mechanical damage.

The pitch of the superconductor assemblies itself is not critical. Even a pitch of from 100 to 300 cm per twist accelerates the decay of the undesired eddy currents, so that they will be attenuated after several hours upon stationary operation of the magnet. If a pitch of several centimeters is selected, that is in the range of from 1 to 30 cm per turn, then the formation of eddy currents can be entirely inhibited.

The composite superconductor is manufactured by first forming an elongated support 1 from single lengths or tube sections, to provide a predetermined length, for example 1,000 m, having a circular cross-section. These single tube sections are welded together to be fluid-tight. Thereafter, a first layer of wires formed of superconductor assemblies 2 and, if desired, wires 3, is spirally twisted about the support 1. Thereafter, the second layer of wires 4 is spirally twisted thereover, with a direction of twist opposite to that of the first layer, and with a pitch which may, for example, be half the pitch of the first layer. The composite is then pressed into the desired shape, for example of square or rectangular cross-section. The wires 2, 3, and the wires 4 of the second layer are interconnected and bonded with each other, and with the support 1 by the bonding material 5, for example by dipping the superconductor into a melt of the bonding material, or carrying it through a bath of molten bonding material, for a period of time sufficiently long to permit the bonding material to be applied by capillary flow and completely surround and encapsulate the layers of wire, interconnecting the wires among themselves and to the support 1.

Bonding material 5, in addition to bonding the wires, further should have good heat transmissibility to ensure good heat transfer between the wires and the support. Additionally, it should be electrically conductive, but non-magnetic. Due to the nature of the superconductive material in the superconductor assemblies, the bonding material should have a melting temperature not above 320° C. It is desirable that the bonding material, when at a temperature of 4.2° K, has an electrical conductivity of at least $1 \cdot 10^{116\ 7}$ Ohm. cm and a heat conductivity of at least 0.4 W/cm · ° K.

The superconductors in accordance with the present invention can be made by the method, as described, easily in substantial length, without requiring manufacture of a special internal connection of the individual superconductive filaments 6. The superconductor wire assemblies 2 can readily be made in lengths of over 1,000 m without causing undesirable high eddy currents therein during operation; such long superconductor assemblies can then readily be applied to long support tubes.

I claim:

1. Method of manufacturing a composite superconductor comprising joining hollow, elongated support tube sections together end-for end to form a continuous fluid-tight support tube;

spirally twisting at least one stabilized superconductor assembly about said continuous support tube;

and bonding said spirally twisted superconductor assembly to the support tube with a material which is highly heat-conductive and non-magnetizable.

2. Method according to claim 1, wherein the step of spirally twisting at least one superconductor assembly comprises the step of spirally twisting a plurality of wires about said support tube to form a first wound layer, some of said wires being formed of said superconductor assemblies;

and said method includes the further step of spirally twisting, with the direction of twist opposite to said first layer, a second layer of wires of non-superconductive material over said first layer;

and said bonding step comprises the step of bonding and encapsulating both said layers to said support.

3. Method according to claim 1, wherein the step of spirally twisting stabilized superconductor assemblies comprises the step of spirally twisting a plurality of wires, some of said wires forming said superconductive assemblies, about said support while maintaining them closely spaced from each other leaving capillary interstices;

and the step of bonding said spirally twisted superconductor assemblies comprises the step of dipping said hollow, longitudinal support tube with said plurality of wires thereon into a melt of bonding material and filling said interstitial spaces by capillary flow.

4. Method according to claim 1, wherein said support tube has a circular cross-section;

and said method includes the step of deforming said support tube with said spirally twisted superconductor assembly bonded thereto into substantially rectangular or square cross section.

5. Method according to claim 2, wherein said first layer is wound with a pitch of about 30 cm or less per winding and said second layer is wound with a pitch of about half of the pitch of the first layer.

6. Method according to claim 1 wherein the step of bonding the spirally twisted superconductor assembly to the support tube comprises introducing said hollow, longitudinal support tube with the stabilized superconductor assembly spirally wrapped around into a melt of highly heat-conductive, non-magnetizable bonding material, and filling the space between successive spiral turns of the spirally wrapped superconductor assembly, and the support tube, with said material of the melt by capillary flow.

7. Method according to claim 6 wherein the melt has a melting temperature below 320° C.

* * * * *